US009735418B2

(12) United States Patent
Woo et al.

(10) Patent No.: US 9,735,418 B2
(45) Date of Patent: Aug. 15, 2017

(54) ANODE ACTIVE MATERIAL FOR LITHIUM SECONDARY BATTERY AND PREPARATION THEREOF

(71) Applicant: LG Chem, Ltd., Seoul (KR)

(72) Inventors: Sang-Wook Woo, Daejeon (KR); Ki-Tae Kim, Daejeon (KR); Yo-Han Kwon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/933,577

(22) Filed: Nov. 5, 2015

(65) Prior Publication Data

US 2016/0056449 A1    Feb. 25, 2016

Related U.S. Application Data

(60) Division of application No. 14/041,280, filed on Sep. 30, 2013, which is a continuation of application No. PCT/KR2012/002581, filed on Apr. 5, 2012.

(30) Foreign Application Priority Data

Apr. 5, 2011 (KR) .................. 10-2011-0031297
Apr. 5, 2012 (KR) .................. 10-2012-0035464

(51) Int. Cl.
*H01M 4/04*    (2006.01)
*H01M 4/133*   (2010.01)
(Continued)

(52) U.S. Cl.
CPC ............ *H01M 4/0452* (2013.01); *C25D 3/30* (2013.01); *H01M 4/133* (2013.01); *H01M 4/134* (2013.01);
(Continued)

(58) Field of Classification Search
CPC .................................................. H01M 4/0452
See application file for complete search history.

(56) References Cited

U.S. PATENT DOCUMENTS 6,030,726 A     2/2000  Takeuchi et al.
6,432,585 B1 *  8/2002  Kawakami .............. C23C 18/31
                                                        429/209

(Continued)

FOREIGN PATENT DOCUMENTS

CN       101275256 A    10/2008
JP       H10-3907 A      1/1998
(Continued)

OTHER PUBLICATIONS

International Search Report for Application No. PCT/KR2012/002581 dated Oct. 25, 2012.
(Continued)

*Primary Examiner* — Barbara Gilliam
*Assistant Examiner* — Nathanael Zemui
(74) *Attorney, Agent, or Firm* — Lerner, David, Littenberg, Krumholz & Mentlik, LLP

(57) ABSTRACT

The present invention relates to an anode active material for a lithium secondary battery, comprising a carbon material, and a coating layer formed on the surface of particles of the carbon material and having a plurality of Sn-based domains having an average diameter of 1 μm or less. The inventive anode active material having a Sn-based domains coating layer on the surface of a carbon material can surprisingly prevent stress due to volume expansion which generates by an alloy of Sn and lithium. Also, the inventive method for preparing an anode active material can easily control the thickness of the coating layer.

5 Claims, 3 Drawing Sheets

(51) Int. Cl.

| | |
|---|---|
| *H01M 4/134* | (2010.01) |
| *H01M 4/139* | (2010.01) |
| *H01M 4/36* | (2006.01) |
| *H01M 4/587* | (2010.01) |
| *H01M 4/38* | (2006.01) |
| *H01M 4/1393* | (2010.01) |
| *H01M 10/052* | (2010.01) |
| *H01M 10/0525* | (2010.01) |
| *C25D 3/30* | (2006.01) |
| *H01M 4/02* | (2006.01) |

(52) U.S. Cl.
CPC ......... *H01M 4/139* (2013.01); *H01M 4/1393* (2013.01); *H01M 4/366* (2013.01); *H01M 4/38* (2013.01); *H01M 4/387* (2013.01); *H01M 4/587* (2013.01); *H01M 10/052* (2013.01); *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 2006/0127773 | A1 | 6/2006 | Kawakami et al. |
| 2006/0133980 | A1* | 6/2006 | Nanba .................. H01M 4/133 423/445 R |
| 2007/0077490 | A1 | 4/2007 | Kim et al. |
| 2009/0274960 | A1 | 11/2009 | Yokouchi |
| 2010/0015514 | A1* | 1/2010 | Miyagi ............... H01M 10/052 429/129 |
| 2010/0120179 | A1 | 5/2010 | Zhamu et al. |
| 2011/0195311 | A1* | 8/2011 | Kim ........................ H01M 4/38 429/231.8 |
| 2012/0121986 | A1* | 5/2012 | Balu ...................... B82Y 30/00 429/231.1 |

FOREIGN PATENT DOCUMENTS

| | | |
|---|---|---|
| JP | 11265716 | 9/1999 |
| JP | H11-242954 A | 9/1999 |
| JP | 2001196052 A | 7/2001 |
| JP | 2004-213927 A | 7/2004 |
| JP | 2004349164 A | 12/2004 |
| JP | 2007-42602 A | 2/2007 |
| JP | 2007042602 A * | 2/2007 |
| JP | 2007-250390 A | 9/2007 |
| KR | 20060095367 A | 8/2006 |
| KR | 20070034254 | 3/2007 |

OTHER PUBLICATIONS

Liu et al, "Preparation of Sn films deposited on carbon nanotubes," ScienceDirect, Applied Surface Science, Elsevier, Amsterdam, NL, vol. 253, No. 20, Aug. 15, 2007, pp. 8356-8359.

Hong, Li, et al., "Synthesis and electrochemical performance of dendrite-like nanosized SnSb alloy prepared by co-precipitation in alcohol solution at low temperature," Journal of Materiral Chemistry, vol. 10, No. 3, Dec. 8, 1999, pp. 693-696.

Lihong Shi, et al., "Nano-SnSb alloy deposited MCMB as an anode material for lithium ion batteries," Journal of Materials Chemistry, vol. 11, No. 5, Apr. 2, 2011, pp. 1502-1505.

Jhan, Yi Ruei, et al., "Electroless-plated tin compounds on carbonaceous mixture as anode for lithium-ion battery," Journal of Power Sources, Elsevier SA, CH, vol. 193, No. 2, Sep. 5, 2009, pp. 810-815.

Morishita, Takahiro, et al., "Preparation of carbon-coated Sn powders and their loading onto graphite flakes for lithium ion secondary battery." Journal of Power Sources, vol. 160, 2006, pp. 638-644.

Office Action from European Application No. 12767472.9, dated Aug. 4, 2016.

Hassoun, et al., "A SnSb—C nanocomposite as high performance electrode for lithium ion batteries." Electrochimica Acta, Elsevier Science Publishers, Barking, GB, vol. 54, No. 19, Jul. 30, 2009, pp. 4441-4444, XP026119580, ISSN: 0013-4686, DOI: 10.1016/J.ELECTACTA.2009.03.27 [retrieved on Mar. 20, 2009].

Park, et al., "Fabrication of Sn—C composite electrodes by electrodeposition and their cycle performance for Li-ion batteries." Electrochemistry Communications, Elsevier, Amsterdam, NL, vol. 11, No. 3, Mar. 1, 2009, pp. 596-598, XP025989212, ISSN: 1388-2481, DOI: 10.1016/J.ELECOM.2008.12.22 [retrieved on Dec. 16, 2008].

* cited by examiner

ANODE ACTIVE MATERIAL FOR LITHIUM SECONDARY BATTERY AND PREPARATION THEREOF

CROSS-REFERENCE TO RELATED APPLICATION(S)

This application is a divisional of U.S. application Ser. No. 14/041,280 filed on Sep. 30, 2013, which is a continuation of International Application No. PCT/KR2012/002581 filed on Apr. 5, 2012, which claims priority under 35 USC 119(a) to Korean Patent Application Nos. 10-2011-0031297 and 10-2012-0035464 filed in the Republic of Korea on Apr. 5, 2011 and Apr. 5, 2012, respectively, the entire contents of which are incorporated herein by reference.

TECHNICAL FIELD

The present invention relates to an anode active material for a lithium secondary battery, and more particularly to an anode active material for a lithium secondary battery, which has a Sn coating layer on the surface of a carbon material.

BACKGROUND ART

Different types of electrolytes are being used for recently widely used electrochemical devices, for example, lithium secondary batteries, electrolytic condensers, electric double-layer capacitors and electrochromic display devices, as well as dye-sensitized solar cells of which various studies are being undertaken for future commercialization, and so the importance of electrolytes is increasing day by day.

In particular, lithium secondary batteries are attracting the most attention due to their high energy density and long cycle life. Generally, a lithium secondary battery includes an anode made of carbon material or lithium metal alloy, a cathode made of lithium metal oxide, and an electrolyte obtained by dissolving a lithium salt in an organic solvent.

Initially, lithium metal was used as an anode active material for an anode of a lithium secondary battery. However, because lithium has low reversibility and low safety, currently carbon material is mainly used as an anode active material of a lithium secondary battery. The carbon material has low capacity compared with lithium, but is advantageous in that it has a small change in volume, excellent reversibility, and low price.

As the use of lithium secondary batteries are expanding, the demand for high-capacity lithium secondary batteries are also increasing more and more. Accordingly, there is a demand for high-capacity anode active materials that may substitute the carbon material having low capacity. In order to meet the demand, attempts were made to use metals as an anode active material, for example, Si, Sn, and the like, that have a higher charge/discharge capacity than the carbon material and that allow electrochemical alloying with lithium.

However, this metal-based anode active material has a great change in volume during charging/discharging, which may cause cracks to an active material layer. Secondary batteries using this metal-based anode active material may suddenly deteriorate in capacity and reduce in cycle life over repeated cycles of charging/discharging, and thus, are not suitable for commercial use.

To solve this problem, attempts have been made to use an alloy of Si and other metal or an alloy of Sn and other metal as an anode active material. The use of such an alloy contributes to the improvement of cycle life characteristics and prevention of volume expansion to some extent when compared with the use of metal alone as an anode active material, but the volume expansion generated during alloying with lithium still causes stress, thereby leading to an insufficient commercial use of secondary batteries.

DISCLOSURE

Technical Problem

Therefore, it is an object of the present invention to provide a Sn-comprised anode active material for a lithium secondary battery, which can effectively prevent stress due to volume expansion generated from an alloy of Sn and lithium.

Technical Solution

In order to achieve the object, the present invention provides an anode active material for a lithium secondary battery, comprising a carbon material, and a coating layer formed on the surface of particles of the carbon material and having a plurality of Sn-based domains having an average diameter of 1 µm or less.

The Sn-based domains may comprise Sn, a Sn alloy or a mixture thereof. The examples of the Sn alloy may be an alloy of Sn and a metal selected from the group consisting of Mg, Al, Ca, Ti, Cr, Mn, Fe, Co, Ni, Cu, Zn, Ga, Ge, Zr, Nb, Pd, Ag, Cd, In, Sb, Pt, Au, Hg, Pb and Bi.

Preferably, the coating layer has a density of 2.2 to 5.9 $g \cdot cm^{-3}$.

The carbon material which may be used in the present invention includes natural graphite, artificial graphite, mesocarbon microbeads (MCMB), carbon fibers, carbon black and a mixture thereof. Also, it is preferred that the carbon material has a specific surface area of 10 $m^2/g$ or less and an average particle size of 5 to 100 µm.

The anode active material of the present invention may be used for preparing an anode of a lithium secondary battery, comprising a current collector and an anode active material layer formed on at least one surface of the current collector. Such an anode may be used for preparing a lithium secondary battery including a cathode, an anode, and a separator interposed between the cathode and the anode.

Furthermore, the present invention provides a method for preparing the anode active material for a lithium secondary battery, which comprises disposing a main electrode and a counter electrode in an electroplating bath and filling the electroplating bath with an electroplating electrolyte; and dispersing a carbon material in the electroplating electrolyte and then applying an electric current to form a coating layer having a plurality of Sn-based domains on the surface of particles of the carbon material.

The electroplating electrolyte which may be used in the present invention includes an acid-based Ni—Sn, Sn—Zn, Sn—Co or Sn—Pb plating solution; a sulfate-based Sn plating solution; a hydrochloride-based Sn plating solution; sulfonate-based Sn, Sn—Pb or Sn—Bi plating solution; a cyanide-based Sn—Cu or Sn—Ag plating solution; or a pyrophosphate-based Sn, Sn—Cu, Sn—Pb or Sn—Zn plating solution.

Advantageous Effects

In accordance with the present invention, the inventive anode active material having Sn-based domains coating layer on the surface of a carbon material comprises Sn in the form of a composite of Sn and the carbon material, and thus is used in a lithium secondary battery to alleviate stress due to volume expansion generated by an alloy of Sn and lithium.

Also, the inventive method for preparing an anode active material can easily control the thickness of the coating layer formed on the surface of the carbon material by controlling a density of an applied electric current and time. From the inventive method, a semibath-type reactor can also be designed and an electrolyte used for electroplating can be recovered.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
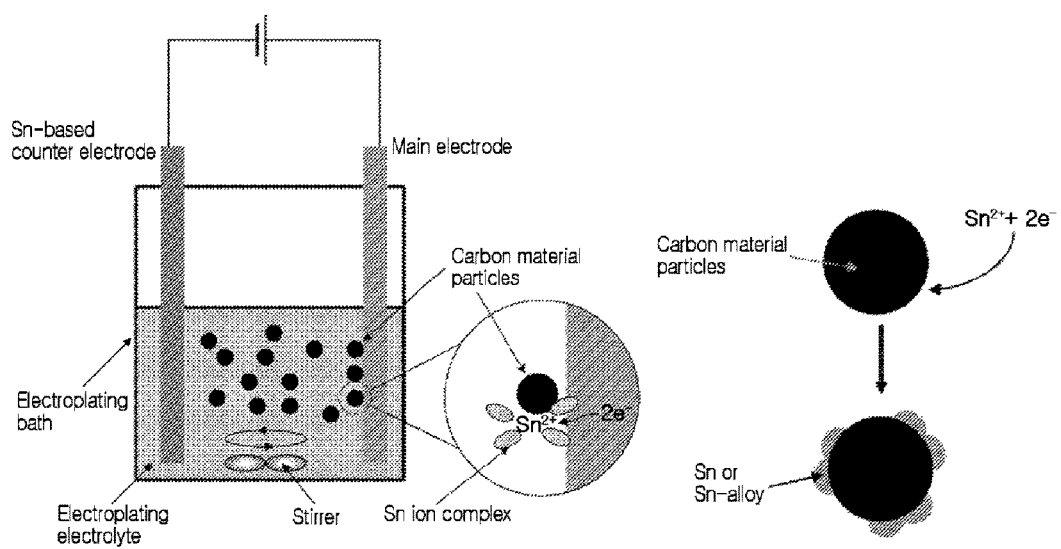
FIG. 1 shows a method for preparing an anode active material in accordance with one embodiment of the present invention.

FIG. 1 shows a method for preparing an anode active material in accordance with one embodiment of the present invention. However, the configurations illustrated in the embodiments and the drawings are just preferable examples for the purpose of illustrations only, not intended to limit the scope of the disclosure, so it should be understood that other equivalents and modifications could be made thereto without departing from the spirit and scope of the disclosure.

An anode active material for a lithium secondary battery according to the present invention comprises a carbon material, and a coating layer formed on the surface of particles of the carbon material and having a plurality of Sn-based domains having an average diameter of 1 μm or less.

The anode active material functions to absorb lithium ions contained in a cathode active material during charging and then generate electric energy along the concentration gradient of lithium ions during the deintercalation of the absorbed lithium ions. If the anode active material is Sn having high charging/discharging capacity, Sn forms an alloy with lithium ions during the absorption of lithium ions to cause volume expansion.

In order to solve such a volume expansion problem due to Sn, the inventors have introduced a coating layer comprising Sn-based materials on the surface of a carbon material.

The coating layer comprising Sn-based materials according to the present invention is characterized by a plurality of Sn-based domains having an average diameter of 1 μm or less. Here, the domains have boundaries, and each of the domains means the assembly of particles which can be separated by at least one domain boundary. The Sn-based domains of the present invention refer to Sn or a Sn-based alloy. The Sn-based alloy may be an alloy of Sn and a metal selected from the group consisting of Mg, Al, Ca, Ti, Cr, Mn, Fe, Co, Ni, Cu, Zn, Ga, Ge, Zr, Nb, Pd, Ag, Cd, In, Sb, Pt, Au, Hg, Pb and Bi.

The Sn-based domains are formed on the surface of the carbon material to make a coating layer. The Sn-based domains formed on the surface of the carbon material may have a hemisphere shape or a porous structure obtained from the agglomeration of several hemispheres. The coating layer of the Sn-based domains is uniformly formed on the whole surface of the carbon material. Preferably, the Sn-based domains have an average diameter of 1 μm or less so as to minimize mechanical stress due to contraction or expansion which is generated in the formation of an alloy with lithium during charging and discharging. That is, when the domains of Sn or Sn-based alloy components have a smaller size, the anode active material can be recovered to its initial size even though the contraction and expansion is generated during charging and discharging.

The lower limit of an average diameter of Sn-based domains is not particularly limited. However, Sn-based domains having an average diameter less than 0.01 μm may be difficult to form physically and thus may have an average diameter of 0.01 μm or higher.

Also, if the coating layer of Sn or Sn-based alloy having a domain form or a porous structure according to the connection of domains has a thickness of several to tens of μm, the coating layer deposited on the surface of the carbon-based anode active material may be delaminated or broken during alloying (intercalation) with lithium to deteriorate life characteristics.

Accordingly, the coating layer has a density of 2.2 (corresponding to a porosity rate of 80%) to 5.9 g·cm$^{-3}$ (corresponding to a porosity rate of 20%), preferably 2.3 to 3.2 g·cm$^{-3}$, more preferably 3.3 to 4.5 g·cm$^{-3}$, and such a density is higher than that of a Sn-based coating layer obtained by an electroless (autocatalytic) plating method which reduces metallic ions in the presence of a reducing agent in an aqueous metal salt solution to deposit metals on the surface of a material to be treated without the external provision of electric energy. The Sn-based domains are uniformly formed on the surface of the carbon material. Thus, the uniform Sn-based domains coating having a high density can provide superior battery characteristics to an anode active material according to one embodiment of the present invention.

The carbon material used in the present invention may include any carbon material which is known as an anode active material in the art, without particular limitation, for example, natural graphite, artificial graphite, mesocarbon microbeads (MCMB), carbon fiber and carbon black. Such a carbon material may be used alone or in a mixture of at least two materials, but is not limited thereto.

In addition, it is preferred that the carbon material has a specific surface area of 10 m$^2$/g or less. If the carbon material has a specific surface area larger than 10 m$^2$/g, the initial efficiency of the anode may decrease. In the present invention, the lower limit of the specific surface area for the carbon material is not particularly limited. A preferred lower limit of the specific surface area may be 2 m²/g, which is just for illustration purposes and the present invention is not limited thereto.

Also, the carbon material may have an average particle size of 5 to 100 μm, preferably 5 to 40 μm. If the carbon material has an average particle size less than 5 μm, the initial efficiency of the anode may decrease due to the fine powders of the carbon material. If the carbon material has an average particle size larger than 100 μm, the processibility for coating an anode slurry may decrease and scratches on an electrode may increase.

The anode active material of the present invention may be prepared by a method as follows.

First, a main electrode and a counter electrode are disposed in an electroplating bath and the electroplating bath is filled with an electroplating electrolyte.

More specifically, as shown in FIG. 1, a Sn-based counter electrode for providing Sn ions and a main electrode to which Sn is deposited are disposed in an electroplating bath, and then the electroplating bath is filled with an electroplating electrolyte. The electroplating electrolyte which may be used in the present invention includes, but is not limited to, an acidic-based Ni—Sn, Sn—Zn, Sn—Co or Sn—Pb plating solution; a sulfuric acid-based Sn plating solution; hydrochloric acid-based Sn plating solution; sulfonic acid-based Sn, Sn—Pb or Sn—Bi plating solution; cyanide-based Sn—Cu or Sn—Ag plating solution; or pyrophosphate-based Sn, Sn—Cu, Sn—Pb or Sn—Zn plating solution. The Sn-based counter electrode for providing Sn ions may be a Sn-based electrode or an electrode made of a Sn-based alloy. The main electrode for the deposition of Sn-based domains may be an electrode made of SuS or Ni, but its type is not particularly limited.

Next, a carbon material is dispersed in the electroplating electrolyte and then applied to an electric current to form a coating layer having a plurality of Sn-based domains on the surface of particles of the carbon material.

More specifically, as shown in FIG. 1, the bath is provided with a stirrer to uniformly disperse the carbon material in the electrolyte. The electric current used for electroplating, which flows through the counter electrode and the main electrode, may be 0.1 to 10 A, and may be used as a pulse current by controlling the time difference and current values of an applied electric current. Preferably, electrodeposition may be conducted for 10 minutes to 5 hours. As shown in FIG. 1, $Sn^{2+}$ ions accept electrons from the main electrode to be deposited on the surface of the carbon material.

Such dispersive electrodeposition may be conducted by using a semibath-type reactor which can calculate the maximum value of theoretical quantities of electrodeposition for Sn or a metal such as Ni, Cu, Co, Zn and Pb, used in the formation of a Sn-alloy, in a plating solution and can easily recover an active material having Sn and a Sn-based alloy plated on the surface of the carbon material and the plating solution after dispersive electrodeposition. The recovered plating solution may be reused.

The anode active material thus prepared according to the present invention may be used to prepare an anode by a conventional method known in the art. Also, a cathode used in the present invention may be prepared by a conventional method known in the art, similar to the anode. For example, the electrode active material of the present invention is mixed with a binder, a solvent, and optionally a conducting material and a dispersing agent to produce a slurry, which is applied to a current collector, followed by compression molding, to prepare an electrode.

The binder which may be used in the present invention includes various kinds of binder polymers, for example, styrene-butadiene rubber (SBR), vinylidenefluoride-hexafluoropropylene copolymer (PVDF-co-HFP), polyvinylidenefluoride, polyacrylonitrile, polymethylmethacrylate, and the like.

The cathode active material which may be used in the present invention preferably includes a lithium-containing transition metal oxide, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), $Li_xFePO_4$ (0.5<x<1.3), and a mixture thereof. The lithium-containing transition metal oxide may be coated with a metal such as Al or a metal oxide. In addition, lithium-containing transition metal sulfide, selenide, or halide may also be used.

After the electrode is made, a conventional lithium secondary battery including the cathode, the anode, a separator interposed between the cathode and the anode, and an electrolyte may be prepared.

In the present invention, a lithium salt used as a solute of the electrolyte is not particularly limited if it is conventionally used in an electrolyte for a lithium secondary battery. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte used in the present invention, an organic solvent contained in the electrolyte is not particularly limited if it is conventionally used in an electrolyte for a lithium secondary battery. For example, the organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulforane, γ-buryrolactone, propylene sulfite, and tetrahydrofuran and or a mixture thereof. In particular, among the above carbonate-based organic solvents, ethylene carbonate and propylene carbonate that are cyclic carbonates are preferred, since they have high viscosity and consequently a high dielectric constant to easily dissociate the lithium salt in the electrolyte. More preferably, such a cyclic carbonate is used in a mixture with a linear carbonate having a low viscosity and a low dielectric constant, such as dimethyl carbonate and diethyl carbonate in a suitable ratio, to provide an electrolyte having a high electric conductivity.

Optionally, the electrolyte stored according to the present invention may further include an additive such as an overcharge inhibitor which is conventionally used in an electrolyte.

Also, the separator which may be used in the present invention includes, but is not limited to, a single-layered or multi-layered porous polymer film conventionally used as a separator, and a porous non-woven fabric conventionally used as a separator, and the like. The porous polymer film may be made of polyolefin-based polymer, for example, ethylene homopolymer, propylene homopolymer, ethylene/butene copolymer, ethylene/hexene copolymer, and ethylene/methacrylate copolymer, and the porous non-woven fabric may be made of, for example, high-melting glass fibers, polyethylene terephthalate fibers, and the like. However, the present invention is not limited thereto.

A battery casing used in the present invention may be any one conventionally used in the art, and the appearance of the battery casing is not limited to a specific shape based on the purpose of use of the battery. For example, the battery casing may have a cylindrical shape, a prismatic shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLES

Example 1

Preparation of Anode Active Material

In order to coat Ni—Sn on a carbon-based active material, an electroplating solution (Ni—Sn electrolyte) was prepared. Specifically, 0.075 M nichel chloride hexahydrate ($NiCl_2.6H_2O$), 0.175 M tin chloride dehydrate ($SnCl_2.2H_2O$) and 0.125 M glycine ($NH_2CH_2COOH$) were added to 0.5 M potassium pyrophosphate ($K_2P_2O_7$) aqueous solution, to which 26% ammonia solution ($NH_4OH$) was added to control pH of the solution.

In 177 g of Ni—Sn plating solution thus prepared, 135 g of spherical natural graphite was dispersed to obtain an electroplating electrolyte (pH 8.02) having a solid content of 43.3%.

As shown in FIG. 1, a Sn-plate (counter electrode) and a SuS mesh (main electrode) were disposed in 100 ml beaker containing the electroplating electrolyte prepared above, which was used as an electroplating equipment, followed by dispersive Ni—Sn electroplating for 1 hour in the condition of an electric current of 1.0 A and a stiffing speed of 800 to 900 rpm.

The resultant obtained from electroplating was washed with distilled water at a pH range of 7.0 to 7.51, and dried at 130° C. for 24 hours, to obtain natural graphite particles coated with a Ni—Sn alloy (yield: about 90% or more) as an anode active material.

Example 2

Preparation of Lithium Secondary Battery

The anode active material prepared in Example 1, SBR (styrene-butadiene rubber) as a binder, CMC (carboxy methyl cellulose) as a thickener and acetylene black as a conducting material were mixed at a ratio of 95:2:2:1 (wt %), and added to water ($H_2O$) as a solvent to obtain a uniform anode slurry. The anode slurry obtained was coated on one surface of a copper current collector at a thickness of 65 μm, dried and compressed, followed by punching to the desired size, to obtain an anode.

Ethylene carbonate (EC) and diethyl carbonate (DEC) as a solvent were mixed at a ratio of 30:70 (vol %), and $LiPF_6$ was added thereto, to obtain 1M $LiPF_6$ non-aqueous electrolyte.

Also, lithium metal foil was used as a counter electrode, i.e., cathode, and then a polyolefin separator was interposed between both electrodes and the electrolyte obtained was introduced, to obtain a coin-type lithium secondary battery.

Comparative Example 1

Preparation of Lithium Secondary Battery

The procedure of Example 2 was repeated except that spherical natural graphite particles having no coating of a Ni—Sn alloy were used, to obtain a coin-shaped lithium secondary battery.

Experimental Example 1

Evaluation for the Surface of Anode Active Material

Figure 2:
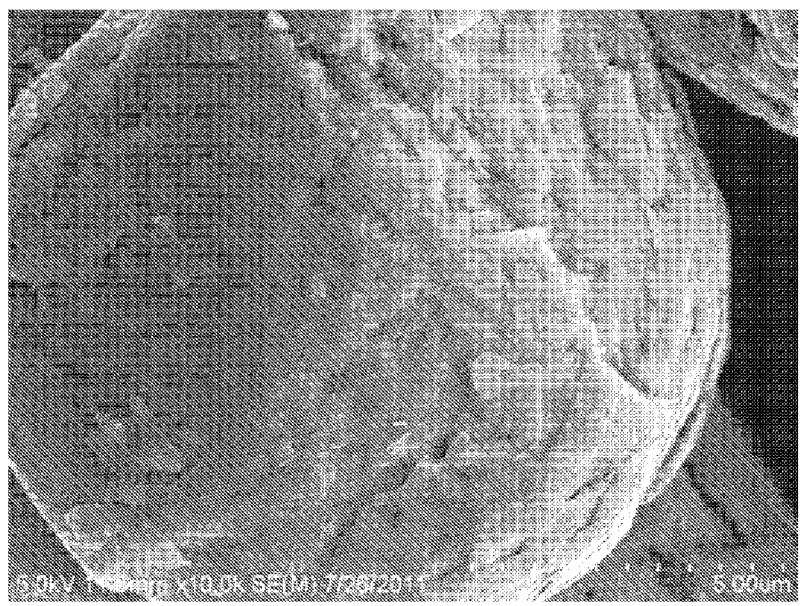
FIG. 2 is a scanning electron microscope (SEM) photograph of the surface of spherical natural graphite particles having no coating of a Ni—Sn alloy.
Figure 3:
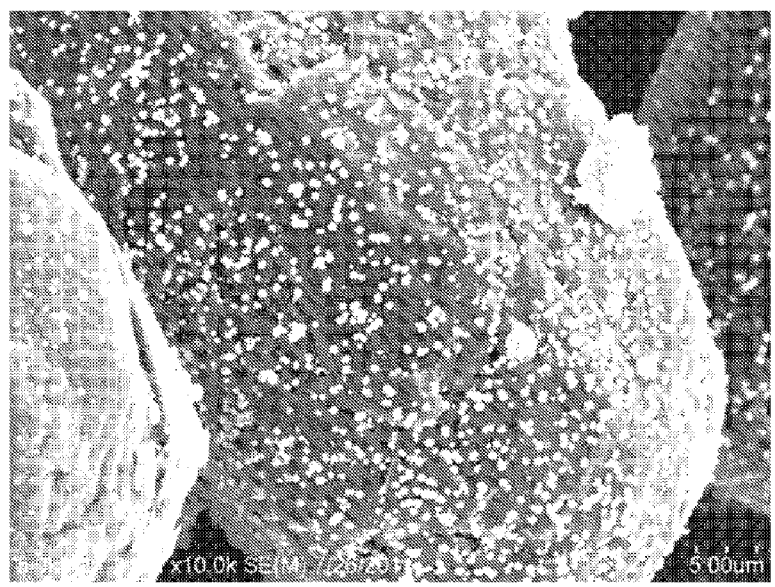
FIG. 3 is a SEM photograph of the surface of spherical natural graphite particles coated with a Ni—Sn alloy, which is an anode active material prepared in Example 1.

The anode active material prepared in Example 1, i.e., the natural graphite particles coated with a Ni—Sn alloy on the surface thereof, and the spherical natural graphite particles having no coating of a Ni—Sn alloy were analyzed for their surface by means of scanning electron microscope (SEM). The results are shown in FIGS. 2 and 3.

Experimental Example 2

Evaluation for the Cycle Characteristics of Coin-type Battery using Anode Active Material The batteries prepared in Example 2 and Comparative Example 1 were evaluated for charge/discharge characteristics.

Specifically, battery charging was made with a current density of 0.1C up to 5 mV at constant current (CC)—constant voltage (CV) mode, kept at 5 mV at CC mode, and completed when the current density reached 0.005C, and battery discharging was made with a current density of 0.1C up to 1V at CC mode. The charging/discharging was repeated 50 times under the same conditions.

Figure 4:
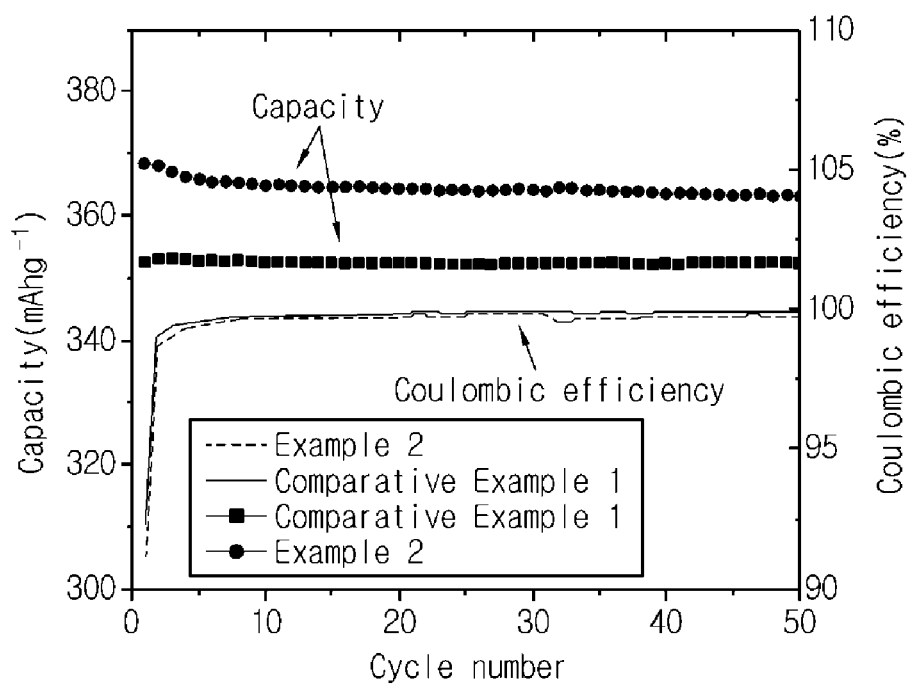
FIG. 4 is a graph showing results evaluating the life characteristics of batteries prepared in Example 2 and Comparative Example 1.

The results of the measured charge/discharge characteristics are shown in FIG. 4.

As can be seen in FIG. 4, the battery of Example 2 using natural graphite particles coated with a Ni—Sn alloy as an anode active material represents an increased capacity and equivalent cycle characteristics due to the Ni—Sn coating, compared to the battery of Comparative Example 1 using simple natural graphite particles as an anode active material, and also the battery of Example 2 represents substantially equivalent coulombic efficiency in the presence of the Ni—Sn alloy coating, compared to the battery of Comparative Example 1.

What is claimed is:

1. A method for preparing an anode active material for a lithium secondary battery, the method comprising:
dispersing a carbon material in an electroplating electrolyte of an electroplating bath, wherein the electroplating bath includes a main electrode and a counter electrode disposed therein; and then
applying an electric current to form a coating layer having a plurality of Sn-based domains having an average diameter of 1 μm or less on the surface of particles of the carbon material, wherein the electric current is a pulse current ranging from 0.1 A to 10 A; and
stirring the electrolyte at a speed ranging from 800 to 900 rpm while the electric current is applied, wherein the anode active material comprises the particles of the carbon material having the coating layer formed on the surface thereof, wherein the Sn-based domains have a hemisphere shape and/or agglomeration of several hemispheres, wherein the Sn-based domains are of an Sn alloy and wherein the Sn alloy is an alloy of Sn and a metal selected from the group consisting of Mg, Al, Ca, Ti, Cr, Mn, Fe, Co, Ni, Cu, Zn, Ga, Ge, Zr, Nb, Pd, Ag, Cd, In, Sb, Pt, Au, Hg, Pb and Bi, and wherein the coating layer has a density of 2.2 to 5.9 $g \cdot cm^{-3}$.

2. The method according to claim 1, wherein the electroplating electrolyte is an acid-based Ni—Sn, Sn—Zn, Sn—Co or Sn—Pb plating solution; a sulfate-based Sn plating solution; hydrochloride-based Sn plating solution; a sulfonate-based Sn, Sn—Pb or Sn—Bi plating solution; a cyanide-based Sn—Cu or Sn—Ag plating solution; or a pyrophosphate-based Sn, Sn—Cu, Sn—Pb or Sn—Zn plating solution.

3. The method according to claim 1, wherein the carbon material is selected from the group consisting of natural graphite, artificial graphite, mesocarbon microbeads (MCMB), carbon fibers, carbon black and a mixture thereof.

4. The method according to claim 1, wherein the carbon material has a specific surface area 10 $m^2/g$ or less.

5. The method according to claim 1, wherein the carbon material has an average particle size of 5 to 100 μm.

* * * * *